United States Patent [19]

Vollkommer et al.

[11] 4,128,709
[45] Dec. 5, 1978

[54] ACRYLATE-BASED POLYMERS AND THEIR USE AS FLAMEPROOFING AGENTS

[75] Inventors: Norbert Vollkommer, Troisdorf; Egon N. Petersen, Neunkirchen-Seelscheid; Herbert Klinkenberg, Troisdorf-Eschmar; Werner Schmidt, St. Augustin-Niederberg, all of Germany

[73] Assignee: Dynamit Nobel Aktiengesellschaft, Troisdorf, Germany

[21] Appl. No.: 697,190

[22] Filed: Jun. 17, 1976

[30] Foreign Application Priority Data

Jun. 21, 1975 [DE] Fed. Rep. of Germany ....... 2527802
Jun. 21, 1975 [DE] Fed. Rep. of Germany ....... 2527803
Oct. 1, 1975 [DE] Fed. Rep. of Germany ....... 2543746

[51] Int. Cl.$^2$ ............ C08F 4/04; C08F 4/32; C08F 18/00; C08F 118/00
[52] U.S. Cl. ................ 526/218; 260/45.75 B; 260/862; 260/DIG. 24; 526/208; 526/216; 526/229; 526/232; 526/232.1; 526/271; 526/292
[58] Field of Search ............... 526/292, 218, 232, 229, 526/232.1, 271; 260/DIG. 24, 45.75 B, 716.24

[56] References Cited

U.S. PATENT DOCUMENTS

| | | | |
|---|---|---|---|
| 2,855,434 | 10/1958 | Fekete | 526/292 |
| 2,891,092 | 6/1959 | Hurdis et al. | 526/292 |
| 3,162,613 | 12/1964 | Tousignant | 526/292 |
| 3,210,326 | 10/1965 | Tousignant et al. | 526/292 |
| 3,538,149 | 11/1970 | Hoffman | 526/292 |
| 3,629,197 | 12/1971 | Stiehl | 526/292 |
| 3,639,305 | 2/1972 | Foster et al. | 526/292 |
| 3,649,668 | 3/1972 | Polinski et al. | 526/292 |
| 3,817,913 | 6/1974 | Gaenzler et al. | 526/292 |
| 3,891,695 | 6/1975 | Chaudhuri et al. | 526/292 |

Primary Examiner—Herbert J. Lilling
Attorney, Agent, or Firm—Sprung, Felfe, Horn, Lynch & Kramer

[57] ABSTRACT

A polymer having as a component thereof a moiety corresponding to a monomer having the following formula

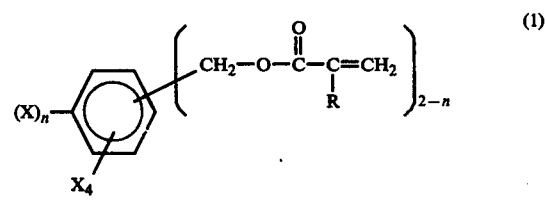

wherein n = 0 or 1, X is bromine, chlorine or a mixture thereof and R represents hyrogen or methyl, a method of preparing the same and the use of such a polymer, including a copolymer thereof in a plastic composition containing a normally flammable plastic.

27 Claims, No Drawings

ACRYLATE-BASED POLYMERS AND THEIR USE AS FLAMEPROOFING AGENTS

BACKGROUND OF THE INVENTION

Field of the Invention

This invention relates to novel polymers and copolymers based on pentabromobenzyl esters and tetrabromoxylylene diesters of the formula

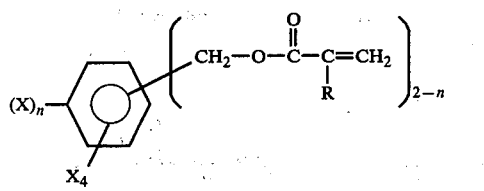

wherein n = 0 or 1, x is bromine, chlorine or a mixture thereof and R is hydrogen or methyl. This invention relates to a method of preparing such polymers and copolymers and the use of such polymers and copolymers in normally flammable plastic compositions.

Discussion of the Prior Art

It is common practice to render thermoplastics fire-resistant or incombustible by adding flame-inhibiting substances to them when they are being prepared or fabricated. As a rule, substances are used for this purpose which have no chemical relationship to the organic polymers constituting the thermoplastics, such as, for example, halogen, or organic or inorganic substances of low molecular weight containing phosphorus and nitrogen, or mixtures of such substances with metal oxides which sometimes interact to enhance the flame-inhibiting action. Such additives to thermoplastics always produce side effects in addition to their flame-inhibiting action, which as a rule are undesirable because they impair the characteristic properties of the thermoplastics and limit their usefulness. Thus all flame-inhibiting substances which are added in powder form to the thermoplastic and remain in powder form therein or, when they cool after being melted and mixed, separate again as an independent phase, produce not only the desired flame-inhibiting effect, but also act as fillers which modify the mechanical properties of the thermoplastics, as a rule by embrittling them, and reduce their elongation at rupture and their impact strength.

Additives which melt upon incorporation into thermoplastics are a source of other disadvantages. Often their vapor pressures are too low at the temperatures at which they are to be fabricated, or they decompose at those temperatures. In nearly all cases, the flame-proofing agents incorporated have a more or less great tendency to diffuse back out of the plastic; this "chalking out" gradually destroys the fire-resistance of the plastics, and plastics which have been flame-proofed in this manner cannot be used in a great number of applications, such as the construction of electrical appliances for example.

Attempts have been made to make plastics of this kind fire-resistant, and a great number of substances are offered on the market for addition to the plastics for the purpose of making them fire-retardant or flameproof. Such substances are, for example, metal compounds of zinc, lead, iron, antimony and aluminum, such as oxides, borates, phosphates and other salts of weak acids, and also chemicals of organic chemistry containing in their molecules components which make them flameproof, such as nitrogen, phosphorus, sulfur, the halogens chlorine and bromine, or combinations thereof. Often mixtures of different substances which enhance one another's flameproofing action are used.

However, the fire-retardant action of these substances is slight, so that considerable amounts of them have to be added to achieve the desired effect. Usually the addition of 12% and more is necessary. Since as a rule these additives are substances which are chemically foreign to the plastics, such as, for example, metal salts or monomolecular chemical compounds, their addition has undesirable effects on the characteristics of the plastics which contain them. That is, these additions often act as fillers and thus have an embrittling effect often, too, they are so poorly compatible with the plastics that they gradually diffuse out of the finished product resulting in a chalky coating on the surface of the plastic mixture. If this chalking becomes apparent even at room temperature, this defect is all the more undesirable in articles which are exposed to an elevated temperature in use. In the case of sublimating flameproofing agents, the resistance of the plastics to fire diminishes, of course, as the flameproofing agent sublimates, so that in such cases lasting protection is not assured. In the electrical industry, plastic articles which chalk in the manner described are entirely unusable, since they can cause considerable trouble in electrical apparatus or installations.

Another frequently observed deficiency in such flameproofing agents is an excessively low decomposition temperature, so that stabilizers must be added when they are incorporated into the plastic involved, and these again modify the properties of the mixture in an uncontrollable manner.

The problem thus arises of flameproofing plastics in such a manner as to avoid the above-described disadvantages and render them equal in their general characteristics to those which have not been flameproofed.

It has therefore become desirable to provide fire-retardant substances which are chemically related to the plastic compositions in which they are to be used. More especially, it has become desirable to provide a flame-retardant agent chemically related to such substances which has a melting point within the processing temperatures employed in fabrication of plastic molding in extrusion compositions into final articles. More especially, it has become desirable to provide such a flame-retardant agent which has an exceptionally high quantity of combined bromine and chlorine content. Moreover, it has become desirable to provide such a fire-retardant composition which is superior to known fire-retardant agents at the same bromine and chlorine content.

SUMMARY OF THE INVENTION

Broadly, this invention contemplates a polymer or copolymer having as a component thereof a moiety corresponding to a monomer having the following formula:

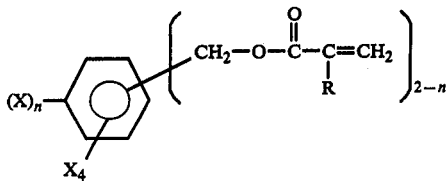

wherein n = 0 or 1, X is bromine, chlorine or a mixture thereof and R represents hydrogen or a methyl group.

In accordance with this invention it has been found that such polymers provide excellent flame-proofing properties especially when incorporated into plastic compositions which are normally flammable. It has been found in accordance with the present invention that polymers and copolymers containing a moiety corresponding to the monomers whose formula is set above can be prepared quite readily by a radical, e.g., free radical polymerization carried out in the presence of a radical forming agent under radical polymerization conditions. Generally, these conditions are those known and generally include a temperature of 0°–150° C. Known radical forming agents can be employed to facilitate the polymerization.

The unsaturated diesters of Formula 1 in which n = 0 can serve as monomers, preferably the isomeric tetrabromoxylylenediacrylates, as well as the isomeric tetrabromoxylylenedimethacrylates, or the mixture thereof, are those having the following formulae:

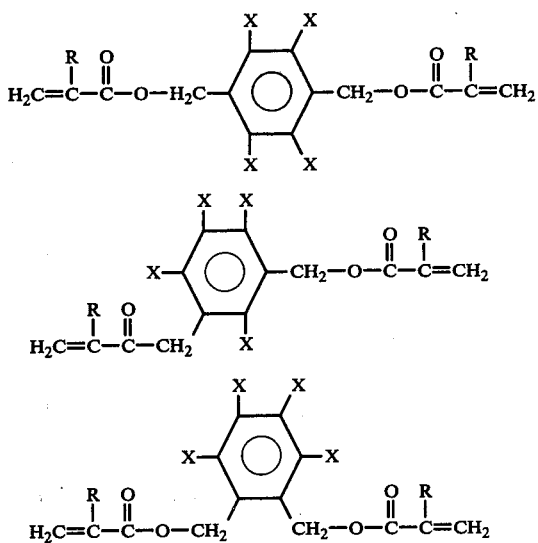

wherein R represents hydrogen or a methyl group and X represents bromine or chlorine. Other isomers are pentabromobenzylacrylate and pentachlorobenzylacrylate and the corresponding methacrylates.

Polymers and copolymers of this invention have if they are soluble molecular weights generally between $1\cdot10^3$ and $10\cdot10^6$ preferably between $5\cdot10^3$ and $5\cdot10^6$. The molecular weight values given are those determinable in accordance with the technique of Gel Permeation Chromatography and Solution Viscosity as published in B. Vollmert, "Goundriss der mackromoleku laren Chemie."

The pentabromobenzylacrylates and methacrylates and the tetrabromoxylylenebisacrylates or bismethacrylates, as the case may be, are ordinarily the pure bromine substitution products, but there are also usable monomers in whose preparation a portion of the bromine bound to the aromatic nucleus has been replaced by chlorine. The use of the substituent X takes this into account. The amount of chlorine generally will not be more than one chlorine per molecule of the monomer, so that the following are to be written as the preferred monomer units, respectively:

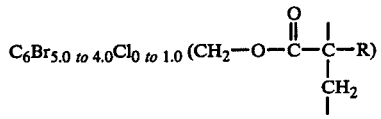

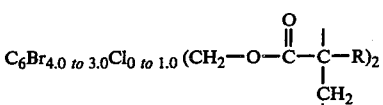

The unsaturated esters of Formula I, the corresponding chlorinated esters and methods for their preparation from alkali salts of acrylic and methacrylic acid and benzyl and xylylene chlorides brominated and chlorinated in the nucleus have recently become accessible.

They can be prepared in accordance with commonly owned Ser. No. 589,958 filed Jan. 24, 1975, the disclosure of which is hereby incorporated herein by reference. The compounds are produced by contacting an alkali salt of $$R' - CH = C(R) - COOH$$

wherein R and R' independently represent hydrogen or methyl with tetrahalogenxylene chloride or xyxylene dichloride or pentabromobenzyl chloride in a polar solvent. Compounds of such formulae can also be produced by reacting acrylic or methacrylic acid in a polar solvent, e.g., in the presence of a polymerization inhibitor, e.g., hydroquinone with an alkali metal hydroxide after which is added to the reaction mixture o- or m-tetrabromoxyxylene dichloride and an alcohol, e.g., methyl glycol. The reaction mixture is heated at 50°–150° C. The resultant alkali metal salt of the acid formed before the addition of the dichloride is present in a stoichiometric excess of 1 to 10 mole percent. This latter method is the invention of Georg Blumenfeld, Hermann Richtzenhain, Wilhelm Vogt and Norbert Vollkommer.

Also subject matter of the present patent application is a method of preparing the polymers and copolymers of the invention by procedures of radical polymerization, e.g., free radical polymerization of ethylenically unsaturated compounds, which method is characterized in that monomers of Formula 1 are polymerized, in some cases with additional ethylenically unsaturated monomers.

Suitable comonomers for the preparation of the copolymers are ethylenically unsaturated monomers which are radically copolymerizable with the above-named acrulates and methacrylates, especially styrene, acrylonitrile, acrylic acid esters and methacrylic acid esters having preferably 1 to 6 carbon atoms in the alcohol radical, unsubstituted xylylene acrylates and methacrylates as well as their chlorine substitution products as disclosed in said U.S. Ser. No. 589,958, butadiene and isoprene, fumaric and maleic acid and their anhydrides and polyesters, and in some cases vinyl chloride vinylidene chloride and others.

Generally speaking where copolymers are prepared the copolymer contains components whose moieties correspond to formula 1 in an amount of between 1 and 99 weight percent, preferably 2 and 80 weight percent, based on the weight of the copolymer.

The polymerization of several comonomers to terpolymers is also contemplated, as for example the polymerization of several comonomers of the group of the acrylates and methacrylates, of acrylonitrile and of the above-named chlorinated acrylates and methacrylates, as well as the common copolymerization of several comonomers onto a support through a graft polymerization, such as for example modified ABS, MBS and high impact strength polystyrene by the polymerization of suitable amounts of acrylonitrile, methacrylates and/or styrene with the addition of substances of Formula 1, onto a support of polybutadiene or polyisoprene. Also contemplated is the cross-linking of unsaturated polyester resins which are prepared from a diol component such as ethylene glycol or neopentyl glycol, an unsaturated acid component such as fumaric or maleic acid, and, in some cases, an additional dicarboxylic acid, and are then subjected to the copolymerization of the unsaturated reactive solvent such as styrene, for example, and of the unsaturated resin basis, with substances of Formula 1. Styrene and methylmethacrylate, among others, are preferred.

Thermoplastic, un-crosslinked homopolymers are obtained when acrylic esters or methacrylic esters of structural Formula 1, wherein $n = 1$, are subjected to polymerization, examples being pentabromobenzylacrylate or pentabromobenzylmethacrylate. The polymerization mechanism is radical. The peroxides or azo compounds used for polymerization processes can be used as radical formers. The polymerization is performed preferably in solution, and is of the nature of a precipitation polymerization since polypentabromobenzylacrylate and polypentabromobenzylmethacrylate are insoluble in ordinary organic solvents up to temperatures around 150° C. The polymerization is performed generally from 0° to 150° C., preferably 20° to 140° C.

Thermoplastic un-crosslinked copolymers are also obtained when unsaturated esters of Structural Formula 1, wherein $n = 1$, such as for example pentabromobenzylacrylate or pentabromobenzylmethacrylate, are copolymerized with comonomers having a polymerization-active C=C double bond, such as styrene or methylmethacrylate or other monomers.

If styrene or methylmethacrylate are copolymerized conventionally with commercial acrylic esters, an internal plasticizing effect is produced: the glass temperature of the copolymers, their rigidity and their thermal stability of shape diminish as the content of the acrylic ester basic building blocks in the copolymer increases.

In contrast, the copolymerization of styrene or methyl methacrylate with the unsaturated esters of Formula 1 in which $n = 1$ results even in an increase in the thermal stability of shape and in the chemical stability of the copolymers, while the glass temperature and mechanical properties remain the same. The Vicat thermal stability of shape of a copolymer of styrene with approximately 6 mole-% of pentabromobenzyl acrylate basic building blocks is 8° to 10° C. higher, and that of a copolymer of styrene with approximately 6 mole-% of pentabromobenzylmethacrylate is 12° to 15° C. higher, than that of a homopolystyrene. The same applies to copolymers with methylmethacrylate.

Another advantage of the copolymers consists in their fire resistance or incombustibility.

The advantage of the flame-proofing method of the invention is that the flame-proofing agent is combined with the thermoplastics by copolymerization (and hence homeopolar bonding), which makes chalking-out impossible.

Furthermore, since the flame-proofing agent is in no way a filler, no impairment of the mechanical properties occurs. In fact, improvements, especially of thermomechanical characteristics, are achieved.

The copolymerization of the unsaturated esters of Structural Formula 1 wherein n is equal to 1 with styrene or acrylic or methacrylic esters and/or other comonomers takes place in accordance with a radical mechanism. Organic or inorganic peroxides or aliphatic azo compounds are used as radical formers. Dibenzoyl peroxide, dicumyl peroxide or potassium peroxydisulfate, and azodiisobutyric acid nitrile are used with preference. The radical formers can be excited to decomposition by high-energy radiation or by a redox reaction.

Conventional polymerization temperatures are used, generally ranging from 0° to 150° C.

The copolymerization can be performed in substance, in solutions or in suspension. Surprisingly it has been found that, although the bromine-containing unsaturated esters of Structure 1 are crystallized compounds of high melting points (pentabromobenzylacrylate melting point: 106–108° C.; pentabromobenzylmethacrylate melting point: 147°–149° C.), copolymerization with styrene or with methyl methacrylate in emulsion can be performed. In this case the copolymerization behavior of the monomeric pairs is substantially the same as in polymerization in substance. By emulsion copolymerization, copolymers of molecular weights as high as several tens of millions can be produced.

Crosslinked, infusible polymeric products are obtained by polymerization or copolymerization of bromine-containing bisacrylic or bismethacrylic esters of Formula 1 with n equal to 0. The polymerization conditions as regards the radical catalysts, the temperature, etc., are the same as those already described, and in the case of copolymerizations involving contents of the Formula 1 substances of up to about 20% by weight, they will be the same as those of the polymerization of the comonomer involved.

If tetrabromoxylylene bisacrylates or bismethacrylates crosslinked by exhaustive polymerization are to be produced, it is not necessary to use separate apparatus for the synthesis of the Formula 1 monomers of $n = 0$ from acrylic or methacrylic acid and tetrabromoxylylene dichloride and for the crosslinking radical polymerization that follows. Both the condensation reaction for the formation of the ester and the polymerization can be performed in a "one-pot reaction" without isolation or refinement of the intermediate product of Formula 1. The crosslinked polymer, which precipitates in insoluble form, is suction filtered, washed with organic solvents, washed free of chloride with water, and dried.

Both the uncrosslinked thermoplastic polymers or copolymers of the bromine-containing acrylic or methacrylic esters of Formula 1 wherein $n = 1$, and the crosslinked polymers or copolymers of the bromine-containing bisacrylic or bismethacrylic esters of Formula 1 wherein $n = 0$, have a thermal stability that is unusual for bromated organic compounds and permits the polymers and copolymers of the invention to be fabricated without problems and to be employed at temperatures as high as 200°-300° C. without danger of decomposition or thermal damage.

The bisacrylates and bismethacrylates of Structure 1 with n = 0 are also interesting components for thermosetting resins (for radical crosslinking).

In this connection one can, after shaping the bisesters, harden them in substance, or also combine them with other acrylates or bisacrylates as a reactive crosslinking component.

Particularly interesting are casting resins consisting of tetrachloroxylylene bisacrylate or bismethacrylate, styrene, and tetrabromoxylylene bisacrylate or bismethacrylate as flame-inhibiting components. These are casting resins which, in the cured state, are equal in their mechanical and thermomechanical properties to the unsaturated polyester resins of high stability of shape. The crosslinking copolymerization of the bromated unsaturated esters of Formula 1 with n = 0 with the other resin components results in an optimum distribution of the flameproofing agent which is anchored into the casting resin by homeopolar binding, which assures optimum flameproofing action and prevents the flameproofing agent from chalking out.

Solutions of unsaturated polyester resins in styrene are also outstandingly suitable as "comonomers" for tetrabromoxylylene diesters of Formula 1 with n = 0.

Unsaturated polyester resins on the basis of unsaturated and, in some cases, saturated dicarboxylic acids, such as maleic acid and maleic acid anhydride, fumaric acid, phthalic acid anhydride, isophthalic and terephthalic acid, and on the basis of alcohols such as ethylene glycol and neopentyl glycol, can be dissolved in a reactive monomer such as styrene to form casting resins. In the hardening process, the maleinate or fumarated double bonds of the unsaturated polyester resin react with the double bonds of the styrene with a radical crosslinking polymerization. If the tetrabromoxylylene diesters of Formula 1 with n = 0 are added as a third component to the solutions of unsaturated polyester resins in styrene, they participate in the crosslinking process, resulting in valuable improvements in the properties of the castings. For example, the Martens thermal stability of shape of an unsaturated polyester resin on the basis of 0.5 mole of neopentyl glycol, 0.5 mole of ethylene glycol, 0.4 mole of phthalic acid anhydride and 0.6 mole of fumaric acid, dissolved 50 to 60 parts by weight in 50 to 40 parts by weight of styrene and hardened, is increased by 10° to 15° C. by the addition of 15 wt.-% of tetrabromoxylylene bisacrylate to the styrene solution, and by more than 20° C. by the addition of 20 wt.-%, while at the same time the impact strength and notch impact toughness surprisingly remain unaffected. Not only the thermal stability of shape but also the ball impression hardness is increased by the addition of the bisacrylate. Generally, the molecular weight of such un-crosslinked unsaturated polyester is 500 to 7000.

Crosslinking copolymerization with 15 wt.-% and 20 wt.-% of tetrabromoxylylene bisacrylate introduces 8.5 and 11.3% of bromine, respectively, into the hardened unsaturated polyester resin, so that, by the addition of 5% and 7% by weight, respectively, of antimony trioxide, self-extinguishing castings can be obtained with a rating of 94/VO in the Underwriters' Laboratories test.

Additional subject matter of the invention is the use of the polymers as flameproofing agents for plastics or as flameproofed plastics. Of especial value are the polymers of the tetrabromoxylylene acrylates, including both those made from the invididual isomers and those made from mixtures thereof.

The copolymers containing less than about 40% by weight of the substances of Formula 1 can be fabricated directly into fire-resistant articles, the special advantages mentioned above being achieved in like manner.

It has been found that by flameproofing according to the present invention problems such as chalking-out are solved. Moreover, high quantities of flameproofing agent are not required to combat the normal migration of polymeric composition of flameproofing agent which is experienced. The flameproofing agents of the present invention are chemically related to the plastics to which they impart flame-retardency. They function ideally as components of the plastic composition and do not significantly provide an undesirable and brittling effect.

Preferably, the flameproofing agents are to contain chlorine and/or bromine in amounts of 35 to 85%, preferably 45 to 75%, by weight. They can be added to the thermoplastics in amounts of 5 to 20%, preferably 7 to 12%, by weight. They are preferably to have a high degree of polymerization and a melting point above 150° C., preferably above 200° C.

In order to more fully illustrate the nature of the invention and the manner of practicing the same the following examples are presented.

It is one aspect of the invention that homo- and copolymers of the bismethacrylates are crosslinked and their molecular weight is up to $\infty$. Homopolymers often are insoluble and their molecular weight is in the range of 10,000 to 5,000,000. Some copolymers have low molecular weights between 500 and 5000, others have molecular weights up to $10 \cdot 10^6$.

It is a special aspect of the invention to use tetrabromoxylene bisacrylate homopolymers themselves and in some cases copolymers as flame retardents in an amount of 5 to 15 weight percent in combustible plastics. It is also possible to use these flame retardents in admixture with other plastic products, e.g. polyethylene, polystyrene, especially arylesters such as polybutylene terephthalates containing crosslinked brominated polybisacrylates.

EXAMPLES

EXAMPLE 1 — Polymerization of pentabromobenzyl acrylate 200 g of pentabromobenzyl acrylate (M.P. 106°-108° C.) is dissolved in one liter of methyl glycol at 80° C. in a three-necked flask provided with a paddle stirrer, a gas introduction tube and a reflux condenser. Under a slow stream of nitrogen, 4 g of dibenzoyl peroxide paste (50% paste) is added as polymerization initiator. After a few minutes of induction time, the colorless polypentabromobenzyl acrylate begins to precipitate in powder form. After 2 h of polymerization time the flask contains a suspension of polymerizate. 2 g of dibenzoyl peroxide paste is added, the temperature is raised to 90° C. for 3 hours, and then, to complete the polymerization, for 4 hours at 110° C. and for 1 hour at 120° C.

The polymer suspension thus obtained is suction filtered hot, washed once with methyl glycol and then with water, and dried at 120° C. to constant weight. 186 g of polypentabromobenzyl acrylate is obtained, which corresponds to a yield of 93%.

The melting range of the polymer is 205° to 215° C. on the Kofler heating bench. The bromine content as determined by elemental analysis is 70.8%.

On the thermoscale, at a heating rate of 8° C./min in an air atmosphere, the polymer undergoes the following weight losses: 1% at 315° C.; 5% at 326° C. and 10% at 332° C. The weight loss under constant exposure to 200° C. in air is 2.2% over a period of 72 hours.

At room temperature as well as at 100° C., polypentabromobenzyl acrylate is insoluble in ordinary organic solvents such as aliphatic and aromatic hydrocarbons, chlorinated hydrocarbons, ethers, cyclic ethers such as dioxane or tetrahydrofuran, esters and ketones, and in dimethylformamide and dimethylsulfoxide.

EXAMPLE 2 — Preparation of polypentabromobenzyl acrylate from pentabromobenzyl chloride and acrylic acid.

75.7 g (1.05 moles) of acrylic acid and 2 g of hydroquinone are dissolved in 800 ml of methyl glycol in a three-necked flask provided with paddle stirrer, gas introduction tube and reflux condenser, and 53.26 g of anhydrous soda (0.5025 mole) is added in portions to form salt. Then 521 g (1 mole) of pentabromobenzyl chloride is added and heated at 110° C. for 3.5 hours. Chloride determination by Mohr's method showed a transformation to pentabromobenzyl acrylate of 97.2%.

The mixture was diluted with one liter of methyl glycol, 10 g of dicumyl peroxide was added as polymerization initiator, and the temperature was raised to 120° C. After 15 h of polymerization, the suspension that formed was worked up as in Example 1. 437 g of polypentabromobenzyl acrylate was obtained, which corresponds to a yield of about 86% with respect to pentabromobenzyl chloride.

EXAMPLE 3 — Preparation of polypentabromobenzyl methacrylate from pentabromobenzyl chloride and methacrylic acid.

In a reaction vessel like the one in Example 1, 9.04 g (0.105 mole) of methacrylic acid and 0.2 g of hydroquinone were dissolved under a slow stream of nitrogen in 100 ml of methyl glycol, and 5.3 g (0.0502 mole) of anhydrous sodium carbonate was added in portions for the formation of salt. Then 52.1 g (0.1 mole) of pentabromobenzyl chloride was added and the mixture was heated for 2 h at 110° C. Determination of chloride by Mohr's method indicated a transformation to pentabromobenzyl methacrylate of 98.4%. The mixture was diluted with 100 ml of methyl glycol, 1.2 g of dicumyl peroxide was added as polymerization initiator, and under a slow stream of nitrogen the temperature was raised to 125° C. After 7 h of polymerization, the product is worked up as in Example 1. 51 g of polypentabromobenzyl methacrylate is obtained corresponding to a yield of 89% with respect to pentabromobenzyl chloride. The polymer has a bromine content, determined by elemental analysis, of 69.2%. The melting range as determined on the Kofler bench is 210° to 225° C. The weight loss on the thermoscale in air, using a heating rate of 8° C./min amounts to 1% at 319° C.; 5% at 332° C. and 10% at 337° C.

The solubility is the same as that of polypentabromobenzyl acrylate.

EXAMPLES 4–11 — Copolymerization of pentabromobenzyl acrylate with styrene in solution.

To determine the copolymerization behavior of the above-mentioned monomer pair, a number of copolymerization batches were polymerized with different monomer ratios in the starting mixture to a maximum transformation of 50% by weight, and the copolymers obtained were analyzed. The following Table 1 shows the polymerization conditions and results. Styrene is slightly preferred in the copolymerization with pentabromobenzyl acrylate.

Table 1:

Copolymerization of styrene ($M_1$) and pentabromobenzyl acrylate ($M_2$) in solution.
Initiator: Azodiisobutyric acid nitrile, 1 wt.-%
Temperature: 60° C

| Ex. No. | Styrene ($M_1$) g | Pentabromobenzyl acrylate ($M_2$) g | Molar ratio[1] $M_1:M_2$ | $\frac{M_1}{M_1 + M_2}$ | Benzene g | Time h | Copolymer g | Bromine content % | Molar ratio[2] $m_1:m_2$ | $\frac{m_1}{m_1 + m_2}$ | Melting temp.[3] (Kofler bench) °C |
|---|---|---|---|---|---|---|---|---|---|---|---|
| 4 | 9.36 | 5.56 | 90:10 | 0.9 | 15 | 5 | 5.4 | — | — | 0.97 | 150 – 160 |
| 5 | 4.16 | 5.56 | 80:20 | 0.8 | 9.5 | 4 | 4.3 | — | — | 0.84 | approx. 160 |
| 6 | 1.56 | 5.56 | 60:40 | 0.6 | 7.5 | 4 | 3.2 | — | — | 0.75 | approx. 165 |
| 7 | 1.3 | 6.7 | 50:50 | 0.5 | 8 | 5 | 3.5 | — | — | 0.66 | approx. 170 |
| 8 | 1.04 | 8.34 | 40:50 | 0.4 | 9.5 | 5 | 4.0 | 57.3 | 1.35 | 0.57 | approx. 150 |
| 9 | 0.78 | 9.73 | 30:70 | 0.3 | 10.5 | 4 | 7.05 | 65.6 | 0.51 | 0.33 | 95 – 105 |
| 10 | 0.26 | 5.56 | 20:80 | 0.2 | 6 | 5 | 3.8 | 64.2 | 0.62 | 0.38 | 80 – 90 |
| 11 | 0.13 | 6.24 | 10:90 | 0.1 | 6.5 | 4 | 5.75 | 68.9 | 0.22 | 0.18 | 135 – 145 |

[1] Molar ratio of the monomers in the initial mixture.
[2] Molar ratio of the basic building blocks in the copolymer, based in Examples 4 to 7 on quantitative NMR spectroscopy, and in Examples 8 to 11 on the bromine content of the copolymers as determined by elemental analysis according to the equation:

$$\frac{m_1}{m_2} = 1 / \frac{104}{\frac{7990.5}{\% \text{ Br}} - 556}.$$

[3] The melting temperature of a styrene homopolymer was determined to be 135 – 145° C.

EXAMPLE 12 — Copolymerization of pentabromobenzyl acrylate with styrene in emulsion.

In a reaction vessel equipped with a paddle stirrer and a nitrogen feed tube, 550 g of water and 21 g of sodium stearate were heated at 50° C. 101 g of pentabromobenzyl acrylate was dissolved in 300 g of styrene at 50° C. (molar ratio 6:94) and stirred into the soap solution.

0.92 g of potassium peroxydisulfate was added to the emulsion as a polymerization initiator, and the mixture was stirred for 24 h under nitrogen at 50° C.

The copolymer was flocculated by pouring the latex into aqueous aluminum sulfate solution, washed with water and dried until the weight was constant. Yield 398 g equal to 99% by weight. Bromine content 17.6% by weight (determined by elemental analysis). Content of pentabromobenzyl acrylate basic building blocks in the copolymer 6.2 ± 1.5 mole-% (NMR spectroscopy). Reduced specific viscosity $\eta_{sp/c} = 15.6$ dl/g (chloroform 25°, 1% solution). Molecular weight $M_{GPC} = 2 \cdot 10^6$ (gel chromatography in tetrahydrofuran). The weight losses measured on the thermoscale in air at a heating rate of 8° C. per minute were 1% at 308° C., 5% at 320° C. and 10% at 334° C.

On pressed plates and from strandard size test pieces sawed therefrom, the following properties were determined in comparison to a homopolystyrene prepared by emulsion polymerization (molecular weight $M_{GPC} \approx 1.3 \cdot 10^6$).

|  |  | Copolymer | Polystyrene |
|---|---|---|---|
| Ball impression hardness | N/mm² | 138 | 145 |
| Ultimate tensile strength | N/mm² | 46 | 38 |
| Bending strength | N/mm² | 76 | 84 |
| Impact strength | KJ/m² | 10.2 | 8.1 |
| Notch impact toughness | KJ/m² | 3.1 | 2.0 |
| Vicat temperature | °C | 111 | 89 |
| Martens temperature | °C | 78 | 66 |
| Combustibility, UL test |  | 94/V0 | failed test |

EXAMPLES 13–15 — Copolymerization of pentabromobenzyl acrylate with styrene in emulsion.

In reaction vessels like those of Example 12, 550 ml of water is placed, and 21 g of sodium stearate is dissolved therein. 33.3 g of pentabromobenzyl acrylate is dissolved in 30.57 g of styrene (molar ratio of the monomers 2:98) in the case of Example 13, 50.1 g of pentabromobenzyl acrylate in 302.4 g of styrene (molar ratio 3:97) in Example 14, and 58.5 g of pentabromobenzyl acrylate in 300.9 g of styrene (molar ratio 3.5:96.5) in Example 15, and the monomer mixtures are stirred into the soap solutions heated at 50° C. 1.0 g of potassium peroxydisulfate is added as polymerization initiator and the mixture is stirred for 24 hours at 50° C. under a slow stream of nitrogen.

The copolymers of Examples 13 to 15 are precipitated by flocculation and processed as in Example 12. The polymerization yields, at 99% by weight, are virtually quantitative. The bromine content as determined by elemental analysis amounts to 7.1, 9.7 and 11.2 percent, respectively, in the copolymers of Examples 13, 14 and 15. On this basis the content of pentabromobenzyl acrylate basic building blocks in the copolymer of Example 13 is reckoned at 2 mole-%; in the copolymers of Examples 14 and 15 it is reckoned at 2.8 and 3.4 mole-%, respectively. This is in good agreement with the values determined by nuclear magnetic resonance spectroscopy: 1.8, 3.2 and 3.8 mole-%. The reduced specific viscosities determined in 1% chloroform solution amount to 20.0, 34.2 and 33.0 dl/g, respectively.

The copolymers are mixed with 5 wt.-% of $Sb_2O_3$, made into a roller skin, and pressed to form sheets 1 mm and 4 mm thick. The combustibility and a number of mechanical characteristics were determined.

| Copolymer containing | 2 mole-% of pentabromobenzyl | 2.8 mole-% acrylate | 3.4 mole-% basic units |
|---|---|---|---|
| Bending strength N/mm² | 82 | 96 | 68 |
| Impact strength KJ/m² | 8.6 | 9.2 | 10.0 |
| Notch impact strength KJ/m² | 2.2 | 2.8 | 2.4 |
| Vicat temperature °C | 106 | 104 | 105 |
| Martens temperature °C | 78 | 77 | 82 |
| Combustibility in UL test | 94/V2 | 94/V2 | 94/V0 |

EXAMPLE 16 — Copolymerization of pentabromobenzyl methacrylate with styrene in emulsion.

360 ml of water was placed in a reaction vessel equipped with a paddle stirrer and a gas introduction tube, 14 g of sodium stearate was added, and the soap solution was heated at 60° C. 68.4 g of pentabromobenzyl methacrylate was dissolved in 195.2 g of styrene at 60° C. (molar ratio 6:94) and the monomer mixture was stirred into the soap solution. 0.6 g of potassium peroxydisulfate was added as polymerization initiator, and the mixture was stirred for 24 hours under a slow stream of nitrogen. After the latex had been flocculated, washed and dried, 257 g of a copolymer was obtained having a bromine content of 16.8% and a reduced specific viscosity as determined in 1% of chloroform of 28 dl/g.

When pressed to form a 4 mm thick board, the copolymer has a bending strength of 89 N/mm², an impact strength of 11 KJ/m², a Vicat temperature of 117° C. and a Martens temperature of 86° C.

Without flame-retardant additives the copolymer has a rating of 94/V1 in the UL test.

EXAMPLES 17–25 — Copolymers of pentabromobenzyl acrylate with methyl methacrylate in solution.

To determine the copolymerization performance of pentabromobenzyl acrylate with methyl methacrylate, a number of batches containing various ratios of monomers in the starting mixture were polymerized to a maximum transformation of 50% by weight, and the copolymers thus obtained were analyzed. Table 2 shows the polymerization conditions and the results. Methyl methacrylate is incorporated in the copolymerization with pentabromobenzyl acrylate with only a slight degree of preference.

Table 2:

Copolymerization of Methyl Methacrylate (M1) with Pentabromobenzyl Acrylate (M2) in solution.
Initiator: Azodiisobutyric acid nitrile, 1% by weight
Temperature: 60° C; 50% solution in benzene

| Ex. No. | M1 (g) | M2 (g) | M1:M2* | $\frac{M1}{M1+M2}$ | Time (min) | Copolymer (g) | Transformation (wt.-%) | Bromine content (%) | m1:m2** | $\frac{m1}{m1+m2}$ |
|---|---|---|---|---|---|---|---|---|---|---|
| 17 | 9.0 | 5.56 | 90:10 | 0.9 | 75 | 4.55 | 31.4 | — | — | 0.95 |
| 18 | 8.0 | 11.12 | 80:20 | 0.8 | 75 | 7.55 | 39.5 | — | — | 0.89 |
| 19 | 3.5 | 8.34 | 70:30 | 0.7 | 75 | 4.2 | 35.4 | — | — | 0.79 |
| 20 | 3.0 | 11.17 | 60:40 | 0.6 | 75 | 6.6 | 46.5 | — | — | 0.71 |
| 21 | 1.25 | 6.7 | 50:50 | 0.5 | 60 | 2.4 | 30.0 | — | — | 0.62 |
| 22 | 1.0 | 8.34 | 40:60 | 0.4 | 60 | 4.7 | 50.2 | 59.9 | 1.11 | 0.52 |
| 23 | 1.5 | 19.46 | 30:70 | 0.3 | 40 | 8.7 | 41.2 | 67.9 | 0.33 | 0.24 |
| 24 | 0.5 | 11.12 | 20:80 | 0.2 | 40 | 5.0 | 43.3 | 67.6 | 0.35 | 0.25 |

Table 2:-continued

Copolymerization of Methyl Methacrylate (M1) with Pentabromobenzyl Acrylate (M2) in solution.
Initiator: Azodiisobutyric acid nitrile, 1% by weight
Temperature: 60° C; 50% solution in benzene

| Ex. No. | M1 (g) | M2 (g) | M1:M2* | $\frac{M1}{M1+M2}$ | Time (min) | Copolymer (g) | Transformation (wt.-%) | Bromine content (%) | m1:m2** | $\frac{m1}{m1+m2}$ |
|---|---|---|---|---|---|---|---|---|---|---|
| 25 | 0.25 | 12.48 | 10:90 | 0.1 | 30 | 5.3 | 41.5 | 70.3 | 0.12 | 0.10 |

*Molar ratio of the monomers in the starting mixture.
**Molar ratio of the basic building blocks in the copolymer; in Examples 17 to 20 this was determined by quantitative NMR spectroscopy, and in the other examples it was based on the bromine content of the copolymers as determined by elemental analysis, in accordance with the equation:

$$\frac{m1}{m2} = 1 / \frac{100}{\frac{7990.5}{\% \, Br} - 556}$$

EXAMPLE 26 — Copolymerization of pentabromobenzyl acrylate with methyl methacrylate in emulsion.

In a reaction vessel equipped with a paddle stirrer and a gas introduction tube, 19 g of sodium stearate is dissolved in 500 ml of water. 50.1 g of pentabromobenzyl acrylate is dissolved at 50° C. in 291 g of methyl methacrylate and the monomer mixture is stirred into the aqueous soap solution heated at 50° C. After the addition of 1.2 g of potassium peroxydisulfate, the mixture is polymerized for 24 hours at 50° C. under a stream of nitrogen.

The polymer is separated as before, and washed with water and methanol, and dried. Yield 331 g (bromine content 8.7 wt.-%). A pressed 4 mm thick board had a bending strength of 90 N/mm$^2$, and an impact strength of 9 KJ/m$^2$, a notch impact toughness of 1.8 KJ/m$^2$, a Vicat temperature of 117° C. and a Martens temperature of 96° C.

For comparison, a homopolymer of methyl methacrylate prepared in emulsion analogously to Example 26 has the following characteristics: bending strength 102 N/mm$^2$, impact strength 7.5 KJ/m$^2$, notch impact strength 1.4 KJ/m$^2$, Vicat temperature 98° C., and Martens temperature 89° C.

EXAMPLE 27 — Copolymerization of pentabromobenzyl acrylate with methyl methacrylate in emulsion.

By the procedure of Example 26, a monomer mixture consisting of 66.6 g of pentabromobenzyl acrylate and 288 g of methyl methacrylate is subjected to copolymerization. 343 g of a copolymer is obtained having a bromine content of 13.1%.

EXAMPLE 28 — Copolymerization of pentabromobenzyl acrylate with methyl methacrylate in substance.

9.4 g of methyl methacrylate and 3.34 g of pentabromobenzyl acrylate plus 0.13 g of azodiisobutyric acid nitrile are weighed into a polymerization vessel and the mixture is polymerized in a nitrogen atmosphere for 15 h at 50° C.

After dissolution in chloroform and precipitation in methanol, followed by washing and drying, 11.4 g of a copolymer is obtained having a bromine content of 15.8%, a content of 5.3 mole-% of pentabromobenzyl acrylate building blocks as determined by quantitative NMR spectroscopy, and a reduced specific viscosity of 1.75 dl/g determined in chloroform (1% solution). The molecular weight determined in THF is: $M_{GPC}$ = 210,000, and the softening temperature on the Kofler bench is 180° to 200° C. The weight losses on the thermal scale (air atmosphere, heating rate 8° C./min) are 1% at 273° C., 5% at 286° C. and 10% at 294° C.

The Vicat temperature of a pressed specimen is 119° C.

EXAMPLE 29 — Crosslinking polymerization of tetrabromoxylylene bisacrylate.

In a reaction vessel as above, 210 g of tetrabromo-p-xylylene bisacrylate (M.P. = 151°–154°) is dissolved in 760 ml of methyl glycol at 80° C., 8 g of dibenzoyl peroxide paste (50% paste) is added as polymerization initiator, and the mixture is polymerized for 4 h at 80° C., 3 h at 90° C. and 2 h at 110° C. under a nitrogen stream. Upon cessation of the reaction a suspension of polymer has formed. The suspension is suction filtered, washed with methanol and then with water, and dried. 198 g is obtained of a crosslinked, insoluble and infusible powdered polymer having a bromine content of 56.6% and the following grain size distribution: larger than 500 μ 3.4 wt.-%; 200–500 μ 23.68 wt.-%; 150–200 μ 15.04 wt.-%; 100–150 μ 42.8 wt.-%; 71–100 μ 13.04 wt.-%; smaller than 71 μ 1.48 wt.-%. On the thermal scale, in air, at a heating rate of 8° C./min., the crosslinked bisacrylate showed the following weight losses: 1% at 296° C.; 5% at 324° C. and 10% at 332° C.

EXAMPLE 30 — Crosslinking polymerization of tetrabromo-p-xylylene bismethacrylate.

By the same procedure as in Example 29, 200 g of tetrabromo-p-xylylene bismethacrylate (M.P. 148°–149° C.) yielded, upon crosslinking polymerization, 192 g of an insoluble and infusible polymer having a bromine content of 54.1%.

EXAMPLE 31 — Preparation of crosslinked tetrabromoxylylene bisacrylate from tetrabromoxylylene dichloride and acrylic acid.

In a three-necked flask as above, 38 g (0.53 mole) of acrylic acid and 0.075 g of hydroquinone are dissolved in 300 ml of methyl glycol and 28.25 g of anhydrous soda is added in portions, with stirring, over a period of 1 h. 123 g (0.25 mole) of tetrabromoxylylene dichloride isomer mixture consisting of 50% m- and 25% each o- and p-isomer is added, and the temperature is raised to 120° C. After 2.5 h at 120° C., 150 ml of methyl glycol and 2.5 g of dicumyl peroxide as polymerization initiator is added, and the mixture is polymerized in a stream of nitrogen for 2 h at 120° C. and 3 h at 130° C. The crosslinked tetrabromoxylylene bisacrylate is separated by suction filtration, washed once with methyl glycol, and then washed chloridefree with water.

After drying at 120° C., 139 g of an infusible, crosslinked, powdered polymer is obtained having a bromine content of 56.7% and a sodium content of less than 0.001%.

Screen analysis:

| >750 μ | 3.04 wt.-% |
|---|---|
| 250 – 750 μ | 29.28 wt.-% |
| 150 – 200 μ | 19.76 wt.-% |
| 71 – 100 μ | 19.04 wt.-% |
| >71 μ | 28.24 wt.-% |

Weight loss (thermal scale, in air, heating rate 8° C. per minute): 1% at 287° C., 5% at 319° C. and 10% at 337° C. The weight loss in air under constant exposure to 200° C. is 2.26% at the end of 3 hours and 3.82% at the end of 48 hours.

EXAMPLE 32 — Tetrabromoxylylene bisacrylate as a reaction component in a bisacrylate resin composition.

A mixture of 100 g of p-xylylene bisacrylate (M.P. 72°–75° C.), 50 g of tetrachloro-m-xylylene bismethacrylate (M.P. 83° C.) and 25 g of tetrabromo-p-xylylene bisacrylate was melted; 1 wt.-% of dicumyl peroxide was added as setting catalyst, and the mixture was poured into molds. The thermosetting is performed for 3 h at 115° C. and curing at 135° C. for 4 h. Transparent, virtually colorless boards of 4 mm and 2 mm thickness, respectively, were prepared, which had a chlorine content of 9.7% and a bromine content of 8%.

The 4 mm board had an impact strength of 4.8 KJ/$m^2$ and a thermal stability of shape of 99° C. (Martens) and 111° C. (ISO/ R 75; A). In the UL test, the 2 mm board was self-extinguishing; rating: 94 / VO.

For comparison, a 4 mm thick board made by the same procedure from a casting resin mixture consisting of 125 g of p-xylylene bisacrylate and 50 g of tetrachloro-m-xylylene bismethacrylate had an impact strength of 5.2 KJ/$m^2$ and a thermal stability of shape of 87° C. Martens and 96° C. ISO/R 75; A. A casting 2 mm thick did not pass the UL test 94.

EXAMPLE 33 — Tetrabromoxylylene bisacrylate as reaction component in a bisacrylate resin composition.

A resin mixture consisting of 150 g of tetrachloro-m-xylylene bisacrylate (M.P. 65°–67° C.) and 25 g of tetrabromo-p-xylylene bisacrylate is melted; 1 wt.-% of dibenzoyl peroxide 50% paste is added, and the mixture is hardened in a mold for 3 h at 85° C. and then cured for 4 h at 130° C. to form a board 4 mm thick having the following characteristics:

| Bending strength: | 110 N/$mm^2$ |
|---|---|
| Ball impression hardness, 30 sec. | 126 N/$mm^2$ |
| Impact strength | 4.6 KJ/$m^2$ |
| Notch impact strength | 1.6 KJ/$m^2$ |
| Thermal stability of shape, Martens | 104° C |
| Thermal stability of shape, ISO/R75; A | 119° C |

EXAMPLE 34 — Tetrabromoxylylene bisacrylate as reactant in a styrene solution of bisacrylate resin.

300 g of tetrachloro-p-xylylene bisacrylate (M.P. 116°–117° C.) and 100 g of tetrabromo-p-xylylene bisacrylate (M.P. 151°–154° C. are dissolved in 400 g of styrene. After the addition of 2 wt.-% dibenzoyl peroxide 50% paste, the resin solution is cast in molds and set for 4 h at 80°–85° C. and then cured for 4 h at 135° C. A 4 mm thick board has a bending strength of 123 N/$mm^2$, a ball impression hardness (30 sec) of 134 N/$mm^2$, an impact strength of 6.7 KJ/$m^2$ and a thermal stability of shape of 126° C. Martens and 138° C. ISO/R 75; A). In the UL test a 2 mm thick board is self extinguishing and has a rating of 94/VO.

EXAMPLES 35–37 — Tetrabromoxylylene bisacrylate as cross-linking component in unsaturated polyester resin solutions.

An unsaturated polyester resin was prepared on the basis of 0.5 mole of ethylene glycol, 0.5 mole of neopentyl glycol, 0.4 mole of phthalic acid anhydride, and 0.6 mole of fumaric acid. The resin, with a gel chromatographic molecular weight $M_{GPC}$ of 2800, is dissolved 50 wt.-parts in 50 wt.-parts of styrene, and tetrabromo-p-xylylene bisacrylate is added to this styrene solution of unsaturated polyester resin in amounts of 15 and 20 wt.-% of the total amount (Examples 36 and 37, respectively). After setting (cold setting with 2% of a 50% paste of dibenzoyl peroxide and 0.2 mole-% of a 10% solution of dimethyl aniline) at 50° C. and curing at 135° C. for 4 h, transparent boards 4 mm thick were obtained having the following characteristics. For comparison, the values are also given for the cured styrene solution of the unsaturated polyester resin solution without the addition of bisacrylate (Example 35).

| Example No. | UP resin solution without addition 35 | UP resin solution 85 : 15 36 | Bisacrylate wt.-% 80 : 20 37 |
|---|---|---|---|
| Ball impression hardness, 30 sec., N/$mm^2$ | 1480 | 1530 | 1690 |
| Impact strength, KJ/$m^2$ | 5.8 | 6.2 | 5.9 |
| Thermal stability of shape: | | | |
| Martens ° C | 95 | 112 | 117 |
| ISO/R 75; A ° C | 114 | 127 | 139 |

By the addition of 15 wt.-% of the tetrabromoxylylene bisacrylate, the thermal stability of shape of the cured UP resin is increased by about 15° C., and by the addition of 20 wt.-% it is increased by about 20° C., without loss of impact strength. An improvement in the ball impression hardness is also to be observed.

If 5% and 7% by weight of antimony trioxide is added, with stirring, to the UP resin solutions treated with tetrabromoxylylene bisacrylate in Examples 36 and 37, respectively, before they are hardened, self-extinguishing castings are obtained in the UL test; rating: 94/VO.

EXAMPLE 38 — Crosslinking polymerization of tetrabromo-m-xylylene bisacrylate.

In a reaction vessel equipped with a paddle stirrer, gas introduction tube and a reflux condenser, 200 g of tetrabromo-m-xylylene diacrylate with a melting point of 105°–108° C. is dissolved in 800 ml of methyl glycol with heating. Under a slow stream of nitrogen, 2 grams of dicumyl peroxide, corresponding to 1% of the weight of the monomer, are added as polymerization initiator, and the mixture is heated to the polymerization temperature of 125° C. The mixture begins to become turbid as a result of precipitating crosslinked polymer, and by the time one hour has elapsed a doughy polymer suspension has formed. Polymerization proceeds for a total of 6 hours at 125° C., and then the polymer is suction filtered, washed with methanol and then with water, and dried up to 150° C.

189 g is obtained of a crosslinked, insoluble and infusible, powdered, colorless polymer having a bromine content of 54.8% and a chloride content of 0.9%. Acrylic ester double bonds are no longer detectable by infrared analysis.

On the thermoscale in air at a heating rate of 8° C. per minute, the crosslinked product shows the following weight losses: 1% at 302° C., 5% at 318° C., 10% at 326° C.

The screen analysis of the crosslinked bisacrylate is:

| >500 μ     | 2.8 wt.-%  |
|------------|------------|
| 200 – 500 μ | 6.9 wt.-%  |
| 150 – 200 μ | 16.0 wt.-% |
| 100 – 150 μ | 48.2 wt.-% |
| 70 – 100 μ | 21.5 wt.-% |
| <70 μ      | 4.6 wt.-%  |

EXAMPLE 39 — Crosslinking polymerization of tetrabromo-m-xylylene bismethacrylate.

By the same procedure as in Example 38, 200 g of tetrabromo-m-xylylene bismethacrylate with a melting point of 97°–99° C. is crosslinkingly polymerized in 600 ml of methyl glycol with the use of 1.4 g of dicumyl peroxide. 193 g of an insoluble, infusible polymer powder is obtained having a bromine content of 53.8%. The weight loss on exposure to air at 200° C. is 2.4% in 24 h and 2.9% in 48 h.

EXAMPLE 40 — Crosslinking polymerization of tetrabromo-o-xylylene bisacrylate.

In a reaction vessel equipped with a paddle stirrer, reflux condenser and gas introduction tube, 100 g of tetrabromo-o-xylylene bisacrylate with a melting point of 100° to 102° C. is dissolved with heating in 400 ml of methyl glycol and, under a slow stream of nitrogen, 3 g of dibenzoyl peroxide 50% paste, corresponding to 1.5 wt.-% of dibenzoyl peroxide, is added as initiator, and the mixture is adjusted to the polymerization temperature of 80° C. It is then polymerized for 3 h at 80° C., 3 h at 90° C. and 2 h at 110° C. The polymer suspension that forms is suction filtered off, washed with methanol, and dried at 150° C. until its weight becomes constant.

96 g of a crosslinked, insoluble and infusible, colorless, powdered polymer is obtained having a bromine content of 56.1%.

Acrylic ester double bonds are no longer detectable by infrared analysis.

The weight loss during exposure to air at 200° C. is 2.9% in 24 h and 3.2% in 48 h.

EXAMPLE 41 — Preparation of crosslinked tetrabromo-m-xylylene bisacrylate from tetrabromo-m-xylylene dichloride and acrylic acid.

To a solution of 156.6 g (2.3 moles) of acrylic acid and 0.3 g of hydroquinone in 1.8 liters of methyl glycol, 84 g (2.1 moles) of sodium hydroxide dissolved in 84 ml of water is added. 492 g (1 mole) of tetrabromo-m-xylylene dichloride is added and the mixture is heated to the reaction temperature of 110° C. After 1.5 hours of reaction, 8 g of dicumyl peroxide is added and the mixture is polymerized under a slow stream of nitrogen for 6 hours at 125° C. After the product was isolated and washed, first with methyl glycol and then with water, and dried, 537 g of crosslinked, insoluble and infusible polymer was obtained. The yield was about 96% of the theory with respect to the tetrabromoxylylene dichloride put in.

The bromine content amounted to 53.0%, the chlorine content 1.6%. The chlorine content results from a slight bromine-chlorine exchange in the nucleus during the preparation of the tetrabromo-m-xylylene dichloride from the tetrabromoxylene. The weight loss on the thermal scale in air at a heating rate of 8° C./min amounts to 1% at 304° C., 5% at 312° C. and 10% at 322° C.

EXAMPLE 42 — Preparation of crosslinked tetrabromo-o-xylylene bisacrylate from tetrabromo-o-xylylene dichloride and acrylic acid.

By the procedure of Example 41, but with the use of anhydrous soda as the salt former, 195 g of crosslinked polymer was obtained from 61.8 g of acrylic acid, 0.11 g of hydroquinone, 45.7 g of $Na_2CO_3$, 184.5 g of tetrabromo-o-xylylene dichloride and 3.75 g of dicumyl peroxide in 675 ml of methyl glycol; this corresponds to a yield of approximately 93% with respect to the tetrabromoxylylene dichloride.

The weight loss on the thermal scale in air, at a heating rate of 8° C./min, is 1% at 297° C., 5% at 320° C. and 10% at 338° C. Acrylic ester double bonds are no longer detectable in the infrared spectrum.

EXAMPLE 43 — Tetrabromo-m-xylylene bisacrylate as reactant in a bisacrylate resin composition.

A mixture of 100 g of p-xylylene bisacrylate (M.P. 72°–75° C.), 50 g of tetrachloro-m-xylylene bismethacrylate (M.P. 83° C.) and 25 g of tetrabromo-m-xylylene bisacrylate (M.P. 105°–108° C.) is melted, treated with 1 wt.-% of dicumyl peroxide as hardening catalyst, and cast in molds. The hardening is performed for 3 h at 115° C. and the curing is performed for 4 h at 135° C. Transparent, virtually colorless boards 4 mm and 2 mm thick are prepared with a chlorine content of 9.7% and a bromine content of 8%. The 4 mm board has an impact strength of 5.7 $KJ/m^2$ and a thermal stability of shape of 92° C. (Martens) and 107° C. (ISO/R 75; A). The 2 mm board is self-extinguishing in the UL test; rating: 94/VO.

For comparison, a 4 mm board prepared by the same procedure from a casting resin mixture consisting of 125 g of p-xylylene bisacrylate and 50 g of tetrachloro-m-xylylene bismethacrylate has an impact strength of 5.2 $KG/m^2$ and a thermal stability of shape of 87° C. (Martens) and 96° C. (ISO/R 75; A). A casting 2 mm thick failed to pass UL test 94.

EXAMPLE 44 — Tetrabromo-m-xylylene bisacrylate as reactant in a bisacrylate resin composition.

A resin mixture consisting of 150 g of tetrachloro-m-xylylene bisacrylate (M.P. 65°–67° C.) and 25 g of tetrabromo-m-xylylene bisacrylate (M.P. 105°–107° C.) is melted down, tested with 1 wt.-% of a 50% dibenzoyl peroxide paste and cast in a mold and hardened for 3 h at 85° C. and then cured at 130° C. for 4 hours to form a 4 mm thick board having the following characteristics:

| Bending strength | 123 $N/mm^2$ |
|---|---|
| Ball impression hardness, 30 sec | 118 $N/mm^2$ |
| Impact strength | 6.7 $KJ/m^2$ |
| Notch impact strength | 1.9 $KJ/m^2$ |
| Thermal stability of shape: | |
| Martens | 102° C |
| ISO/R 75; A | 111° C |

EXAMPLE 45 — Tetrabromo-o-xylylene bisacrylate as a reactant in a styrene solution of bisacrylate.

300 g of tetrachloro-p-xylylene bisacrylate (M.P. 116°–117° C.) and 100 g of tetrabromo-o-xylylene bisacrylate (M.P. 100°–102° C.) are dissolved in 400 g of styrene. After the addition of 2 wt.-% of a 50% paste of dibenzoyl peroxide, the resin solution is poured into molds and set, first at 80°–85° C. for 4 h, and then at 135° C. for 4 h. A board 4 mm thick has a bending strength of 112 N/mm$^2$, an impact strength of 9.3 KJ/m$^2$ and a thermal stability of shape of 115° C. (Martens) and 129° C. (ISO/R 75; A). A 2 mm thick board is self-extinguishing in the UL test and has a rating of 94/VO.

EXAMPLES 46–48 — Tetrabromo-m-xylylene bisacrylate as a crosslinking component in unsaturated polyester resin solutions.

An unsaturated polyester resin was prepared on the basis of 0.5 mole of ethylene glycol, 0.5 mole of neopentyl glycol, 0.4 mole of phthalic acid anhydride and 0.6 mole of fumaric acid. This resin, with a molecular weight $M_{GPC} = 2800$ as determined by gel chromatography, is dissolved 50 weight-parts in 50 weight-parts of styrene and tetrabromo-m-xylylene bisacrylate is added to this solution of UP resin in styrene in amounts of 15 and 20% of the weight of the entire mixture (Examples 47 and 48, respectively).

After hardening at room temperature with 2% of a 50% paste of dibenzoyl peroxide and at 50° C. with 0.2 mole-% of a 10% solution of dimethylaniline in styrene, and curing at 135° C. for 4 h, transparent 4-mm boards were obtained having the following characteristics. For comparison, the characteristics of the hardened styrene solution of the unsaturated polyester resin without the addition of bisacrylate (Example 46) are also given herewith:

| Example No. | UP resin solution without bisacrylate 46 | Ratio of UP resin solution to bisacrylate: 85 : 15 47 | 80 : 20 48 |
|---|---|---|---|
| Bending strength N/mm$^2$ | 93.5 | 107.0 | 116.5 |
| Ball impression hardness, 30 sec N/mm$^2$ | 1480 | 1475 | 1510 |
| Impact strength KJ/m$^2$ | 5.8 | 7.2 | 6.4 |
| Thermal stability of shape: | | | |
| Martens ° C | 95 | 106 | 112 |
| ISO/R 75; A | 114 | 124 | 127 |

The addition of 15 wt.-% of tetrabromoxylylene bisacrylate increases the thermal stability of shape of the cured UP resin by about 10° C., and the addition of 20 wt.-% increases it by about 15° C., without diminishing the impact strength. An improvement in the bending strength is also to be observed.

If 5% and 7% of antimony trioxide, by weight, is added to the UP resin solutions containing tetrabrom-m-xylylene bisacrylate of Examples 47 and 48, respectively, before they are hardened, castings are obtained which are self-extinguishing in the UL test; rating: 94/VO.

EXAMPLE 49

10 wt.-% of the following infusible polymers crosslinked by curing:
(a) Poly-1,2,4,5-tetrabromo-p-xylylene-1,4-bisacrylate
(b) Polytetrabromo-m-xylylene-1,3-bisacrylate
(c) Polytetrabromo-o-xylylene-1,2-bisacrylate of a polymer prepared by polymerization of a
(d) Mixture of 40–60 wt.-% of the p-compound (a) and approximately equal parts of the m-compound (b) and the o-compound (c)

is mixed together with 5% of Sb$_2$O$_3$ and 30 wt.-% of glass staple fibers 6 mm long, plus enough polybutylene terephthalate to make 100 parts by weight, and the mixture is fabricated in an extruding machine to strands which are chopped into granules. The fabrication presents no difficulty; no formation of vapors and no brown discoloration is observed at the necessary machine temperatures of 250° to 260° C. From the granules thus obtained, test specimens measuring 5 × ½ × 1/16 inches are injection molded for Underwriters Laboratories test UL 94, and tested for fire resistance. The results were ratings of "VO" for the test specimens both as delivered and after 7 days of standing at 70° C. Samples of the test specimens were stored for 14 days at 70° C., and others for 7 days at 150° C.; in no case was any coating to be found on the surface.

If these results are compared with those obtained from a mixture prepared precisely as described except for the use of 10 wt.-% of the commercial flameproofing agent decabromodiphenyl or octabromodiphenyl ether in place of 10 wt.-% of poly-1,2,4,5-tetrabromo-p-xylylene-1,4-bisacrylate, the same flameproofing is achieved, but after only 7 days at 70° C. perceptible chalking occurs, and after 7 days at 150° C. an intense chalking is observed.

EXAMPLE 50

Following the procedure of Example 49, but with the use of 10 wt.-% of infusible poly-1,2,4,5-tetrabromo-p-xylylene-1,4-bismethacrylate instead of poly-1,2,4,5-tetrabromo-p-xylylene-1,4-bisacrylate (compound a), fire-retardant polyesters are prepared:
(A) with enough polybutyleneterephthalate to make 100 parts,
(B) with enough polyethyleneterephthalate to make 100 parts, which give good results in the inflammability tests and have very little tendency to chalk.

EXAMPLE 51

30% of glass fibers (6 mm) and 58% of polybutyleneterephthalate are mixed with 8% of polypentabromobenzyl acrylate (compound b, Example 49, melting range 205°–215° C.) and made into chopped granules on an extruding machine as in Example 49. The granules are injection molded to form specimens for UL test 94 and for measurement of mechanical characteristics. The fabrication is performed without difficulty. UL test 94 shows a rating of VO/VO; no chalking is observed even after 7 days of exposure to heat at 150° C.

For comparison, a material is prepared after the same formula, but instead of 8% of compound b, Example 49, the same amount of commercial pentabromodiphenyl ether is used as a flameproofing agent, which is recommended for use in polyesters. This flameproofing agent vaporizes severely during fabrication in the extruding machine and injection molding machine. UL test 94 gives a rating of only V1/V1 for this material containing pentabromodiphenyl ether. No chalking occurs upon 7 days of exposure to heat; if, however, the specimen in accordance with the invention and a specimen of the material used for comparison are heated in separate glass flasks at 1 Torr for 7 hours at 150° C., the specimen of the invention shows a weight loss of only 0.2%, while that of the other material is 2.1%.

The mechanical characteristics were as follows:

|  |  | Invention Specimen | Control Specimen |
|---|---|---|---|
| Ball impression hardness DIN 53456/1/1973 | $N/mm^2$ | 185.0 | 222 |
| Tensile strength, length-wise, DIN 53455 | $N/mm^2$ | 118.3 | 111.8 |
| Elasticity modulus, tensile test, DIN 53457 | $N/mm^2$ | 98.30 | 91.50 |
| Bending strength DIN 53452 | $N/mm^2$ | 162.8 | 161.5 |
| Impact strength at +23° C DIN 53453 | $KJ/m^2$ | 39.0 | 27.1 |
| Notch impact stength at +23° C DIN 53453 | $KJ/m^2$ | 11.0 | 8.7 |
| Stability of shape on exposure to heat, ISO/R 75 DIN 53461 | °C | 190 | 184 |

The improvement in the fire resistance of the invention specimen is also accompanied by a considerable improvement in important mechanical characteristics.

EXAMPLE 52

8% of the flameproofing agent c used in accordance with the invention, a copolymer of 90 mole-% of pentabromobenzyl acrylate and 10 mole-% of butanediol monoacrylate still containing 0.2% free OH groups, are fabricated with 4% $Sb_2O_3$ and 88% polybutylene terephthalate as in Example 1 /check example number!/ into test specimens for UL test 94. For comparison, a control mixture is used which is made in accordance with the same formula, except that commercial octabromodiphenyl is used as the flameproofing agent.

In UL fire resistance test 94, the mixture /containing compound/ c achieves the rating V0/V0, but with octabromodiphenyl only V1/V1. After 14 days of heating at 150° C., the invention specimen has no coating of any kind, but the control specimen has a perceptible white coating of octabromodiphenyl after only 7 days. If both specimens are heated each in a long-necked glass flask at 1 Torr for 7 hours at 180° C., the invention specimen remains unaltered, while in the colder parts of the glass flask containing the control specimen, crystals of octabromodiphenyl have settled; the weight loss after heating amounts to 0.18% in the invention specimen, and in the control it is 1.2%.

EXAMPLE 53

83 weight % acrylnitrile-butadiene-styrene-copolymer[isate] are mixed in a two roller corn mill with 12 weight % poly-pentabromide-benzylacrylate (b) and 5 weight % $Sb_2O_3$, the rolled sheet is crushed and molded by injection [injectionmolded] into test substances for the fire test according to UL 94. The results of the fire test are V1/V1. Chalking out cannot be observed.

EXAMPLE 54

A copolymer of tetrabromo-p-xylylene glycol bisacrylate and tetrachloro-p-xylylene glycol bisacrylate, with a bromine content of 29 wt.-% and a chlorine content of 17 wt.-% and having a melting point above 250° C., is added in the amount of 11 wt.-%, together with 5 wt.-% of antimony trioxide, to a commercial polybutylene terephthalate; the mixture is made into chopped granules in a double screw extruding machine, and then injection molded to make test specimens for UL test 94. The fire resistance rating is V0/VI; no chalking is perceived on the specimens even after 7 days of heating at 150° C. 7 hours of heating at 180° C. and 1 Torr produces a weight loss of only 0.14%.

EXAMPLE 55

The infusible polytetrabromoxylylene bisacrylate (PTA) named in Example was added in amounts of 12 wt.-%, together with 5 wt.-% of $Sb_2O_3$ to
 (a) commercial polypropylene
 (b) commercial polystyrene.
The oxygen index (Ox.I.) values measured show a good and in some cases superior effectiveness in comparison with the 0 value of the plastics containing no flameproofing agents, in accordance with the table below.

EXAMPLE 56

The polypentabromobenzyl acrylate (PPA) referred to in Example was incorporated in amounts of 12 wt.-%, together with 5 wt.-% of antimony trioxide, into
 (a) Commercial polypropylene
 (b) Commercial polyethylene
 (c) Commercial ABS,
and was found to have good flame inhibiting action, in accordance with the oxygen index in comparison with the 0 value.

| | | Additive | | | Comparison Ox. I. |
|---|---|---|---|---|---|
| Ex. | Plastic | Kind | Amount | Ox. I. | O value |
| 55 a | Polypropylene | PTA | 12 | 21.2 | 17.3 |
| 55 b | Polystyrene | PTA | 12 | 22.5 | 17.3 |
| 56 a | Polypropylene | PPA | 12 | 23.0 | 17.3 |
| 56 b | Polyethylene | PPA | 12 | 27.0 | 18.5 |
| 56 c | ABS | PPA | 12 | 24.0 | 20.5 |

What is claimed is:

1. A solid homopolymer of a monomer having the formula

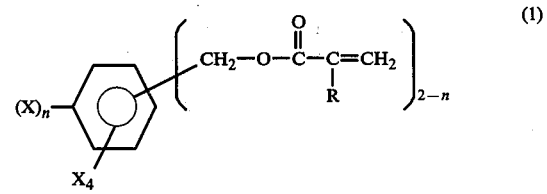

wherein n = 0 or 1, X is bromine or chlorine, R is hydrogen or methyl, said polymer having a molecular weight between $1 \times 10^3$ and $10 \times 10^6$, said molecular weight being determined by gel permeation chromatography in tetrahydrofuran.

2. A polymer according to claim 1 wherein n = 0.

3. A polymer according to claim 2 wherein X is bromine.

4. A polymer according to claim 2 wherein X is a mixture of bromine and chlorine.

5. A polymer according to claim 2 which is cross-linked and infusible.

6. A polymer according to claim 1 having a molecular weight between $5 \cdot 10^3$ and $5 \cdot 10^6$ determined by gel permeation chromatography in tetrahydrofuran.

7. A polymer according to claim 1 having on the phenyl radical 4–5 bromine atoms and 0 or 1 chlorine atoms.

8. A polymer according to claim 1 having on the phenyl radical 3–4 bromine atoms and 0–1 chlorine atoms.

9. A polymer according to claim 1 wherein said monomer has the formula

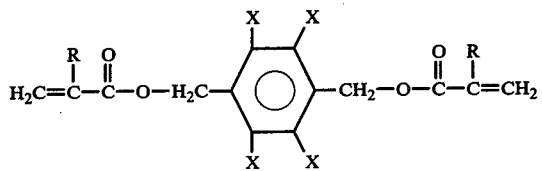

10. A polymer according to claim 1 wherein said monomer has the formula

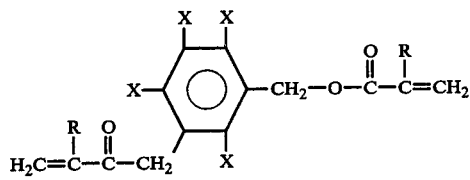

11. A polymer according to claim 1 wherein said monomer has the formula

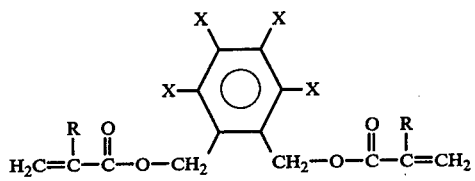

12. A polymer according to claim 1 wherein said monomer is pentabromobenzylacrylate.

13. A polymer according to claim 1 wherein said monomer is pentachlorobenzylacrylate.

14. A polymer according to claim 1 wherein said monomer is pentabromobenzylmethacrylate.

15. A polymer according to claim 1 wherein said monomer is pentachlorobenzylmethylacrylate.

16. A polymer according to claim 1 wherein n = 1.

17. A polymer according to claim 16 wherein said polymer is thermoplastic and uncrosslinked.

18. A polymer according to claim 17 wherein said monomer is pentabromobenzyl acrylate.

19. A polymer according to claim 17 wherein said monomer is pentabromobenzylmethacrylate.

20. A process for preparing the polymer of claim 1 which comprises contacting a monomer of the formula

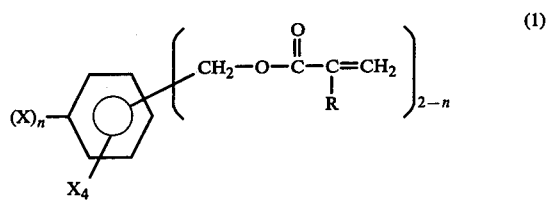

wherein n = 0 or 1, X is bromine or chlorine, R is hydrogen or methyl with a radical polymerization catalyst under radical polymerization reaction conditions.

21. A process according to claim 20 wherein said reaction conditions include a temperature of between 0° and 150° C.

22. A process according to claim 21 wherein the radical polymerization catalyst is an organic peroxide, an inorganic peroxide or an aliphatic azo compound.

23. A process according to claim 22 wherein said radical polymerization catalyst is selected from the group consisting of dibenzoyl peroxide, dicumyl peroxide, potassium peroxydisulfate and azodiisobutyric acid nitrile.

24. A flame-retardant plastic composition comprising a normally flammable plastic and the polymer of claim 1.

25. A flame-retardant plastic composition according to claim 24 wherein the polymer of claim 1 contains 35 to 85% chlorine and/or bromine.

26. A flame-retardant plastic composition according to claim 24 wherein the polymer of claim 1 is present in an amount 5 to 20 weight percent.

27. A flame-retardant plastic composition according to claim 26 wherein said polymer is present in said plastic composition in an amount of 7 to 12% by weight.

* * * * *

UNITED STATES PATENT AND TRADEMARK OFFICE
CERTIFICATE OF CORRECTION

PATENT NO. : 4,128,709
DATED : December 5, 1978
INVENTOR(S) : Vollkommer et al.

It is certified that error appears in the above–identified patent and that said Letters Patent are hereby corrected as shown below:

Column 11, 5th line down in the table should read as follows:

-- Notch impact toughness $KJ/m^2$  3.1  2.0 --.

Column 11, 6th line down in the table, delete in first column "$KJ/m^2$".

Signed and Sealed this

Twenty-fourth Day of April 1979

[SEAL]

Attest:

RUTH C. MASON
Attesting Officer

DONALD W. BANNER
Commissioner of Patents and Trademarks